US012504412B2

United States Patent
Lu et al.

(10) Patent No.: US 12,504,412 B2
(45) Date of Patent: Dec. 23, 2025

(54) TITRATION MODULE, TEST APPARATUS AND METHOD FOR MEASURING TITRATION CONTACT ANGLES

(71) Applicant: King Yuan Electronics Co., Ltd., Hsinchu (TW)

(72) Inventors: Chieh-Wen Lu, Hsinchu (TW); Yu-Hao Ciou, Hsinchu (TW); Po-Ting Lai, Hsinchu (TW); Kuang-Hsiang Liu, Hsinchu (TW)

(73) Assignee: KING YUAN ELECTRONICS CO., LTD., Hsinchu (TW)

( * ) Notice: Subject to any disclaimer, the term of this patent is extended or adjusted under 35 U.S.C. 154(b) by 1079 days.

(21) Appl. No.: 17/522,998

(22) Filed: Nov. 10, 2021

(65) Prior Publication Data

US 2022/0229031 A1 Jul. 21, 2022

(30) Foreign Application Priority Data

Jan. 19, 2021 (TW) ................. 110101992

(51) Int. Cl.
*G01N 31/00* (2006.01)
*G01B 7/30* (2006.01)
*G01B 11/06* (2006.01)
*G01N 31/16* (2006.01)

(52) U.S. Cl.
CPC .............. *G01N 31/16* (2013.01); *G01B 7/30* (2013.01); *G01B 11/0608* (2013.01)

(58) Field of Classification Search
CPC ...... G01B 11/0608; G01B 11/26; G01B 7/30; G01B 11/255
See application file for complete search history.

(56) References Cited

U.S. PATENT DOCUMENTS

| | | | | |
|---|---|---|---|---|
| 7,121,642 | B2 * | 10/2006 | Stoessel | B41J 2/125 347/14 |
| 2005/0122363 | A1 * | 6/2005 | Koyama | B41J 2/0456 347/19 |
| 2010/0255746 | A1 * | 10/2010 | Hanaoka | G01B 11/00 445/24 |
| 2020/0368778 | A1 * | 11/2020 | Wang | B05D 7/24 |
| 2021/0018417 | A1 * | 1/2021 | Neumann Barros Ferreira | G01N 13/00 |
| 2022/0051866 | A1 * | 2/2022 | Yasuda | H01J 1/05 |
| 2022/0120681 | A1 * | 4/2022 | Kim | G01N 21/552 |
| 2025/0089995 | A1 * | 3/2025 | Yuan | A61B 1/0011 |

FOREIGN PATENT DOCUMENTS

| | | |
|---|---|---|
| CN | 110579428 A | 12/2019 |
| TW | 201816398 A | 5/2018 |

* cited by examiner

*Primary Examiner* — Shogo Sasaki
(74) *Attorney, Agent, or Firm* — BACON & THOMAS, PLLC (57) ABSTRACT

A titration module includes a base, at least one titration unit, a contact angle measuring module, and a computing unit. The at least one titration unit is disposed above the base for titrating a globule onto a device under test. The contact angle measurement module is disposed above the base for measuring a first height and a first radius of the globule. The computing unit can calculate a second radius according to the first height and the first radius, and can calculate a contact angle of the globule according to the first height and the second radius. Also disclosed are a test apparatus, and a method for measuring titration contact angles.

24 Claims, 10 Drawing Sheets

TITRATION MODULE, TEST APPARATUS AND METHOD FOR MEASURING TITRATION CONTACT ANGLES

BACKGROUND OF THE INVENTION

1. Field of the Invention

The present invention relates to a titration module, a test apparatus, and a measuring method, and more particularly, to a titration module, a test apparatus, and a method which are used for measuring titration contact angles.

2. Description of Related Art

Generally speaking, a biosensor performs biological tests by titrating test solution on the induction zone of a unit under test. An induction zone normally has a surface of microporous material, such that when test solution is titrated on the induction zone, globules having specific contact angles can be formed thereon. Therefore, in case the units under test become defective in the manufacturing process, problems will be incurred such as uneven coating, disuniform dimensions for the microelectromechanical systems (MEMS) structure of the surface layer. This results in abnormal contact angles of the globules, and it is possible to determine, by the contact angles, whether or not the units under test are defective.

Nowadays the way to measure the contact angles of the globules is to mount cameras at the sides of test stations so as to take pictures of the globules. Such measurement, however, has to take much more space, and so the cameras cannot be integrated into the probe card automatic test apparatus. Besides, such a way of measurement is defective as far as accuracy is concerned.

Given the above, with the spirit of aggressive innovation, an improved "Titration Module, Test Apparatus and Method for Measuring Titration Contact Angles" was conceived for solving the above-mentioned problems, and through persistent research and experiments, the present invention has eventually been accomplished.

SUMMARY OF THE INVENTION

An object of the present invention is to provide a titration module, comprising a base, at least one titration unit, a contact angle measuring module, and a computing unit. The at least one titration unit is disposed above the base for titrating a globule onto a device under test. The contact angle measurement module is disposed above the base for measuring a first height and a first radius of the globule. The first height relates to the maximum height of the globule in a longitudinal direction, and that the first radius relates to the radius of the maximum projected area of the globule in a longitudinal direction and the longitudinal direction is orthogonal to a contact surface between the globule and the device under test. The computing unit calculates a second radius according to the first height and the first radius. In addition, the computing unit calculates a contact angle of the globule according to the first height and the second radius.

Another object of the present invention is to provide a test apparatus, comprising a prober, a titration module, and a test head. The prober comprises a movable carrier and a probe card, where the movable carrier is provided for carrying a device under test and the probe card is located above the device under test. The titration module comprises a base, at least one titration unit, a contact angle measurement module, and a computing unit, where the at least one titration unit is disposed above the base for titrating a globule onto the device under test. The contact angle measurement module is disposed above the base, and is provided for measuring the first height and the first radius of the globule. The first height relates to the maximum height of the globule in a longitudinal direction, and that the first radius relates to the radius of the maximum projected area of the globule in a longitudinal direction and that the longitudinal direction is orthogonal to a contact surface between the globule and the device under test. The computing unit calculates a second radius according to the first height and the first radius, and that the computing unit calculates a contact angle of the globule according to the first height and the second radius. The test head comprises a test circuit board, where the test circuit board is electrically connected with the probe card.

Still another object of the present invention is to provide a method for measuring titration contact angles, where the method is performed by the titration module. The titration module comprises a base, at least one titration unit disposed above the base, and a contact angle measurement module and a computing device both disposed above disposed the base. The at least one titration unit is provided for titrating a globule onto a device under test. The contact angle measurement module comprises a height measurement laser module and a camera module. The method for measuring titration contact angles comprises the following steps: the height measurement laser module measures the first height above the globule; and the camera module measures the first radius above the globule, wherein the first height relates to the maximum height of the globule in a longitudinal direction, and the first radius relates to the radius of the maximum projected area of the globule in a longitudinal direction and the longitudinal direction is orthogonal to a contact surface between the globule and the device under test; and wherein the computing unit calculates a second radius according to the first height and the first radius, and the computing unit calculates a contact angle of the globule according to the first height and the second radius.

Other objects, advantages, and novel features of the invention will become more apparent from the following detailed description when taken in conjunction with the accompanying drawings.

DETAILED DESCRIPTION OF THE PREFERRED EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

The term "connected" as used herein refers to aspects such as direct connection or indirect connection, and is not limited thereto. The term "when . . . " herein may denote "during the time that . . . ", "before . . . ", or "after . . . " and is not limited thereto.

In the specification of the present invention, the ordinal numbers, such as "first" or "second", are used to distinguish a plurality of elements having the same name, and it does not mean that there is essentially a level, a rank, an executing order, or an manufacturing order among the elements, except otherwise specified.

Figure 1:
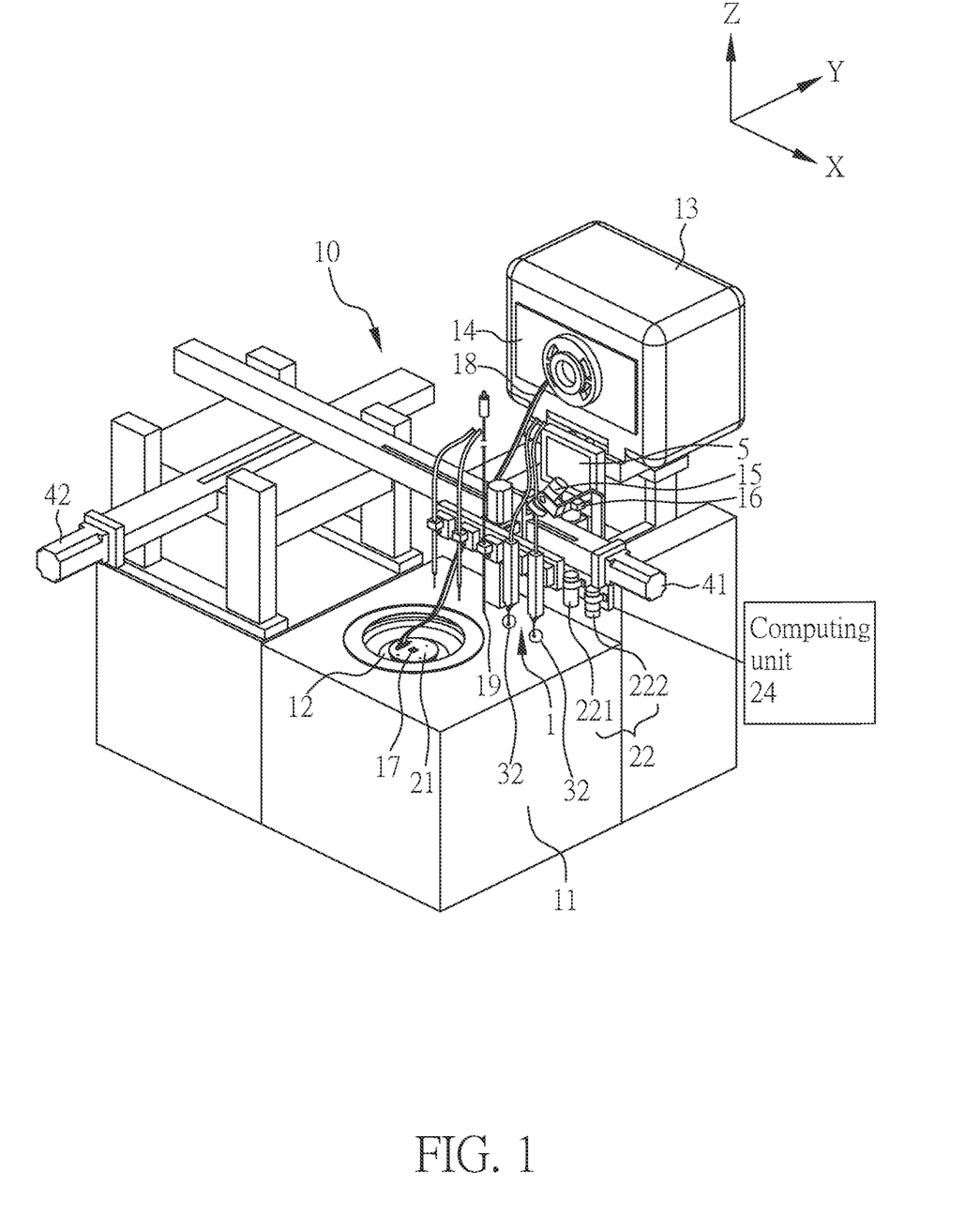
FIG. 1 is a schematic diagram illustrating a test apparatus according to an embodiment of the present invention.

FIG. 1 is a schematic diagram illustrating a test apparatus 10 according to an embodiment of the present invention. The test apparatus 10 comprises a titration module 1, a prober 11, a camera monitor 15, a laser rangefinder 16, and a test head 13.

According to the present invention, the titration module 1 is disposed above the prober 11, and may be combined together with the prober 11. The prober 11 comprises a movable carrier 12 and a probe card 21, where the movable carrier 12 is provided for carrying a device under test 17 (for instance, a biochip, a wafer, and so forth, though not so limited), and the probe card 21 is located above the device under test 17. As such, a tested position of the device under test 17 can be adjusted by the movable carrier 12, so that the device under test 17 can be located corresponding to the titration module 1 on the prober 11 and the probe card 21 inside the prober 11, and tests can be performed for test fluids and for electrical property. Further, the test head 13 comprises a test circuit board 14, where the test circuit board 14 can be electrically connected with the probe card 21 through a signal wire 18 so as to transmit and calculate test signals instantly. This will achieve the purpose of test automatization, and to increase efficiency for tests. Besides, the camera monitor 15 and the laser rangefinder 16 can be employed to monitor and to align with a relative position and a relative distance between a tip portion 32 of the titration module 1 and the device under test 17, so as to ensure that alignment between the titration module 1 and the device under test 17 is accurate.

Further, according to the present invention, the test apparatus 10 further comprises a clean device 19 for cleaning a surface of the device under test 17 after completion of the measurement. According to the present invention, the clean device 19 relates to, for instance, a suction device or a blower for cleaning surface of the device under test 17 after completion of the measurement, such as by way of air-suctioning or air-blowing, the test fluids on the device under test 17 can be removed.

Figure 2:
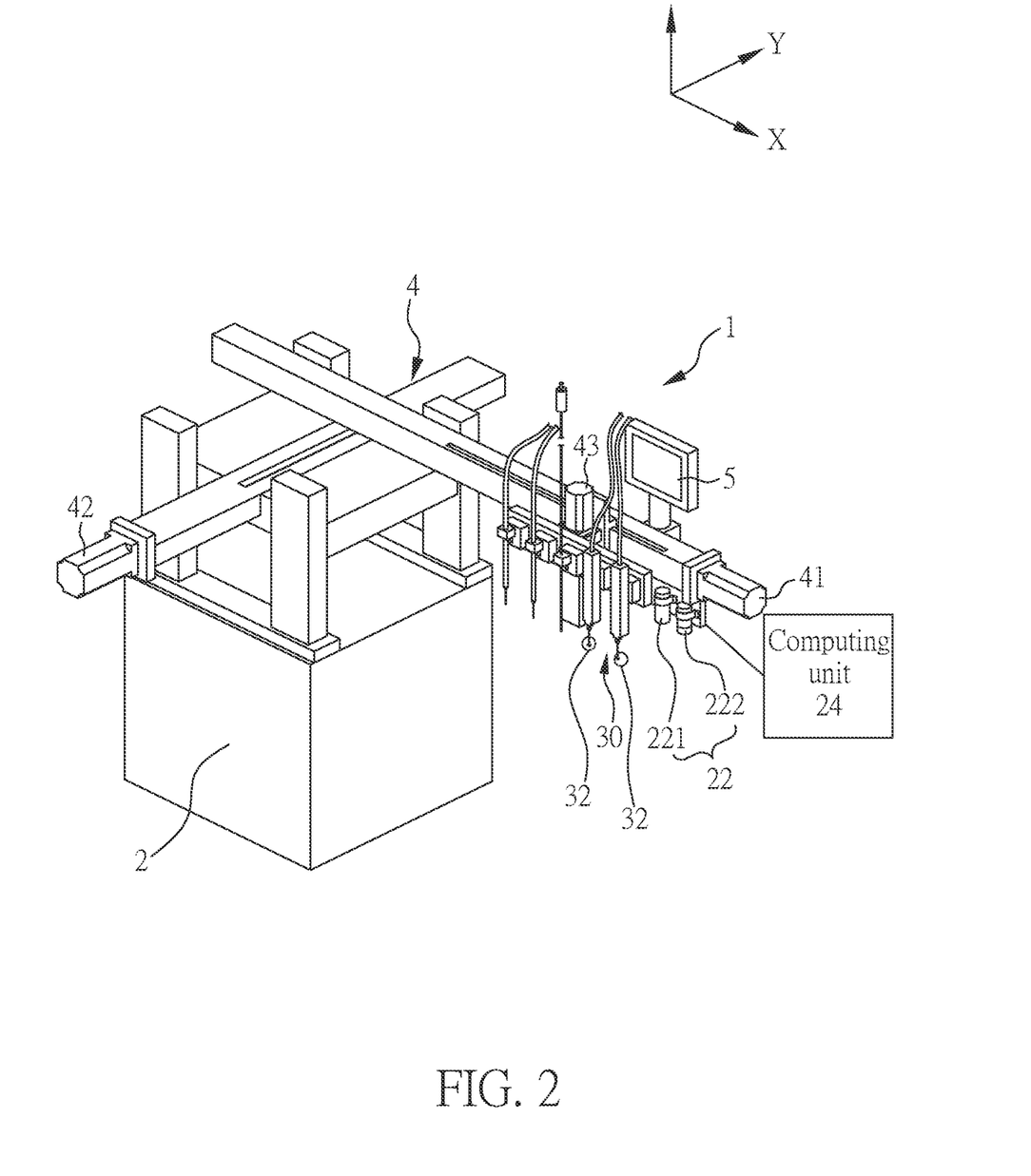
FIG. 2 is a schematic diagram illustrating a titration module according to an embodiment of the present invention.

Now a reference is made to FIG. 2, a schematic diagram illustrating the titration module 1 according to an embodiment of the present invention; and also to FIG. 1.

As shown in FIG. 2, the titration module 1 comprises a base 2, at least one titration unit 30, a contact angle measurement module 22, and a computing unit 24. In addition, according to the present invention, the titration module 1 further comprises a carrier unit 4 and a control unit 5.

Figure 3A:
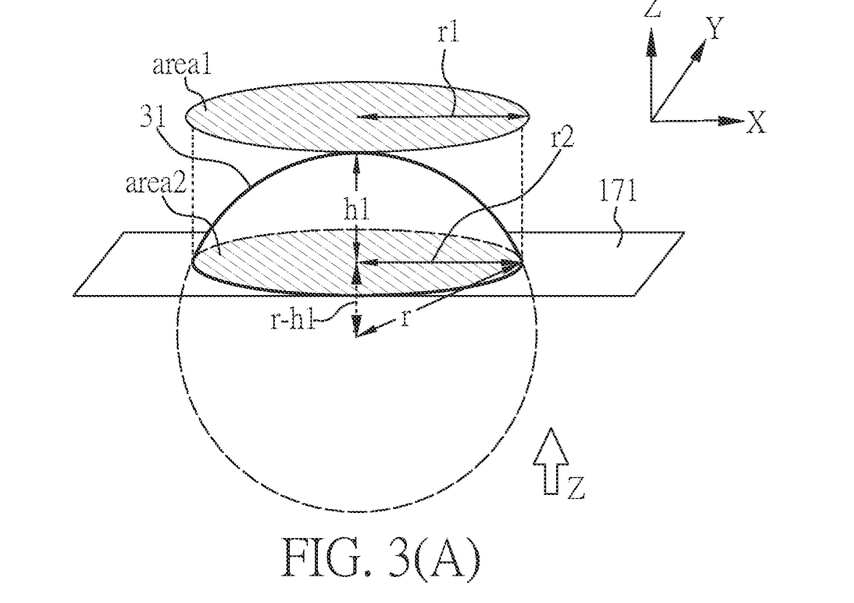
FIG. 3(A) is a schematic diagram illustrating a globule on a hydrophilic contact surface according to an embodiment of the present invention.
Figure 3B:
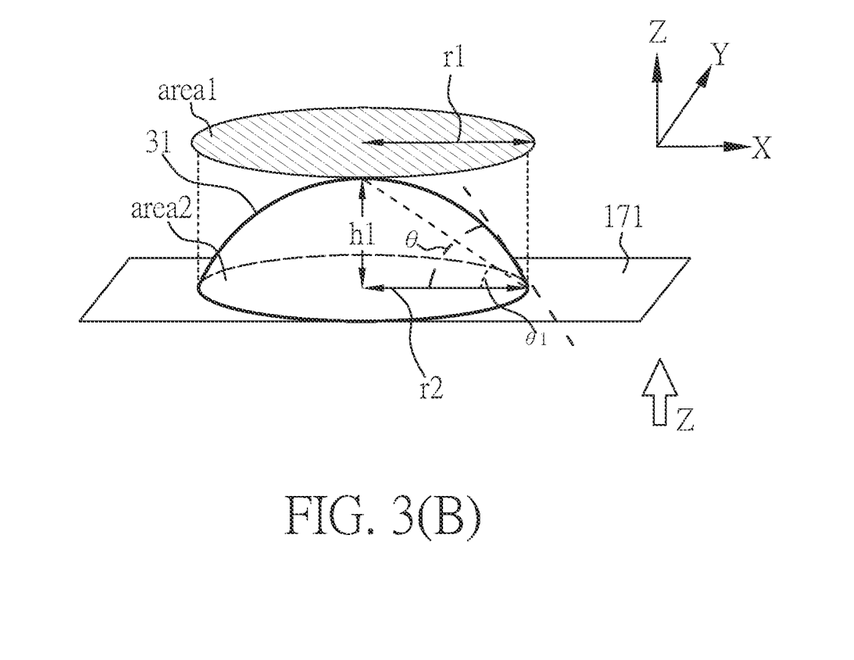
FIG. 3(B) is a schematic diagram illustrating a contact angle of the globule on the hydrophilic contact surface as shown in FIG. 3(A)

The at least one titration unit 30 is disposed above the base 2 for titrating a test fluid (globule 31) onto the to-be tested position of a contact surface 171 of the device under test 17 (as indicated on FIG. 3(A) and FIG. 3(B)), so as to proceed with a test (for instance a biochip test). The to-be tested position refers to a measuring point on a surface of a chip in a wafer (for instance the measuring point t1, t2, t3, or t4 of FIG. 5(A)), so as to prevent the globule 31 from contacting the other portions of the wafer or the chip. The contact surface 171 of the device under test 17 relates to microporous material, such that in accordance with properties of the material, the globules 31 can be formed in various shapes. In an embodiment, the properties of the material of the contact surface are categorized into hydrophilic and hydrophobic. Accordingly, the characteristics of the globules 31 on different contact surfaces 171 are described as follows.

Figure 3C:
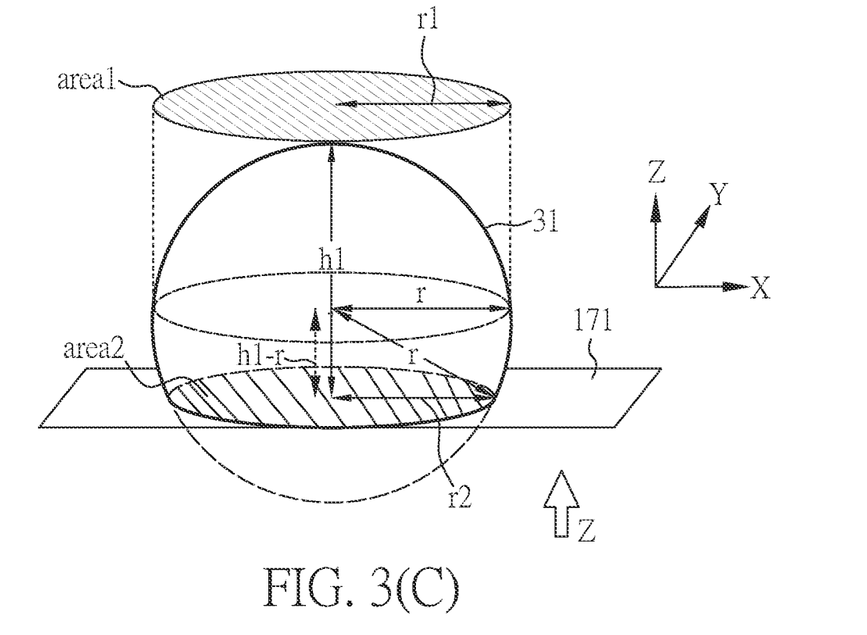
FIG. 3(C) is a schematic diagram illustrating a globule on a hydrophobic contact surface according to an embodiment of the present invention.

Further, references are made to FIG. 3(A), a schematic diagram illustrating a globule 31 on a hydrophilic contact surface 171; FIG. 3(B), a schematic diagram illustrating a contact angle of the globule 31 on the hydrophilic contact surface 171 as shown in FIG. 3(A); FIG. 3(C), a schematic diagram illustrating a globule 31 on a hydrophobic contact surface 171; and FIG. 3(D), a schematic diagram illustrating a contact angle of the globule 31 on the hydrophobic contact surface 171 as shown in FIG. 3(C). Wherein, "area1" is defined as the maximum projected area of the globule 31 orthogonal to the contact surface 171 in a longitudinal direction (Z direction), and "area2" relates to a contact area for the globule 31 to contact the contact surface 171. A first height h1 (considered as a real height of the globule 31) is defined as the maximum height for the globule 31 in a longitudinal direction (Z direction). A first radius r1 is defined as the radius of the maximum projected area area1 of the globule 31. A second radius r2 is defined as the radius of the contact area area2 of the globule 31. A radius r is defined as the radius of a whole sphere of the globule 31. A contact angle $\theta$ is defined as the angle that the globule 31 contacts the contact surface 171.

As shown in FIG. 3(A) and FIG. 3(B), the hydrophilic contact surface 171 has an adhesion with the liquid greater than the cohesion of the liquid itself, making the liquid form a smaller contact angle $\theta$ on the contact surface 171 (for instance smaller than or equal to 90 degrees, though not so limited). As such, when the globule 31 falls on the contact surface 171, the globule 31 will diffuse on the contact surface 171 easily, and that the shape of the globule 31 will become half a sphere or smaller than half a sphere. Under such circumstances, the first height h1 (the real height) of the globule 31 will be smaller than or equal to the first radius r1, as such, the first radius r1 is equal to the second radius r2. It is therefore understood when the first height h1 is smaller than or equal to the first radius r1, or when the contact angle θ is smaller than or equal to 90 degrees, the contact surface 171 can be determined as hydrophilic.

Figure 3D:
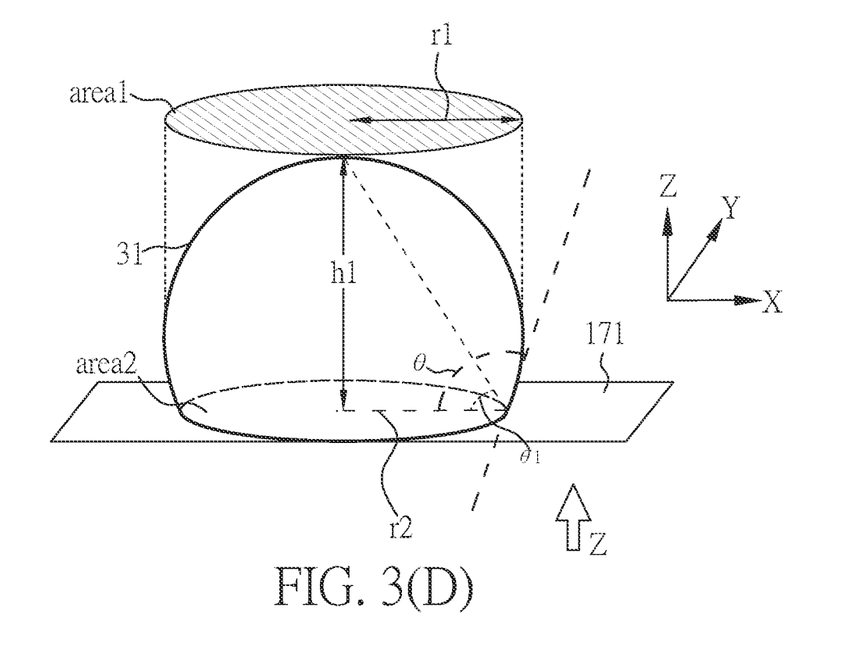
FIG. 3(D) is a schematic diagram illustrating a contact angle of the globule on the hydrophobic contact surface as shown in FIG. 3(C)

Now as shown in FIG. 3(C) and FIG. 3(D), the hydrophobic contact surface 171 has an adhesion with the liquid smaller than the cohesion of the liquid itself, making the liquid form a greater contact angle θ on the contact surface 171 (for instance greater than 90 degrees, though not so limited). As such, when the globule 31 falls on the contact surface 171, the globule 31 may be difficult to diffuse on the contact surface 171, and that the shape of the globule 31 may become slightly greater than half a sphere. Under such circumstances, the first radius r1 of the globule 31 may be exactly the radius r of the whole sphere, that the first height h1 is greater than the first radius r1, and that the second radius r2 of the globule 31 can be defined as:

$$r2 = \sqrt{2r1h1 - h1^2}$$ (Formula 1);

wherein r1 is defined as the first radius, h1 defined as the first height, and r2 defined as the second radius. The maximum projected area, area 1, for the globule 31 on the contact surface 171 is greater than the contact area area2, for the globule 31 on the contact surface 171, and as such, the first height h1 is greater than the first radius r1. It is understood, therefore, if the first height h1 is greater than the first radius r1, or if the contact angle θ is greater than 90 degrees, the contact surface 171 can be determined as hydrophobic. Given the above, the characteristics of the globules 31 can be perceived.

Further, the components, other than the titration module 1, are described as follows, together with references to FIG. 2 to FIG. 3(D).

As shown in FIG. 2, the contact angle measuring module 22 is disposed above the base 2, and is provided for measuring the first height h1 and the first radius r1 of the globule 31. According to the present invention, the contact angle measuring module 22 comprises a height measurement laser module 221 and a camera module 222, where the height measurement laser module 221 is provided for measuring the first height h1 of the globule 31, and the camera module 222 is for measuring the first radius r1 of the globule 31.

Further, as shown in FIG. 2 to FIG. 3(D), the computing unit 24 can calculate the second radius r2 according to the first height h1 and the first radius r1. In addition, the computing unit 24 can calculate the contact angle θ of the globule 31 according to the first height h1 and the second radius r2. According to the present invention, the computing unit 24 can calculate the contact angle θ by way of the following formula:

$$\theta = 2\theta 1 = 2\tan^{-1}\left(\frac{h1}{r2}\right);$$ (Formula 2)

wherein θ is defined as the contact angle, and θ1 is defined as half a contact angle.

In an embodiment, when the contact angle measurement module 22 measures the first height h1 and the first radius r1, the computing unit 24 can compare the first height h1 with the first radius r1, such that in case the first height h1 is smaller than or equal to the first radius r1, the computing unit 24 can determine that the contact surface 171 is hydrophilic (for instance the contact angle θ is smaller than or equal to 90 degrees, though not so limited), and then sets the first radius r1 as the second radius r2. When the first height h1 is greater than the first radius r1, the computing unit 24 can determine that the contact surface 171 is hydrophobic (for instance the contact angle θ is greater than 90 degrees, though not so limited), and then by way of Formula 1, the second radius r2 can be calculated. As such, the contact angle θ can be calculated accurately.

Further, in an embodiment, the at least one titration unit 30 can transmit information of the actual volume of a titrated globule 31 to the computing unit 24, and the computing unit 24 can calculate a measured volume according to the first height h1 and the second radius r2. Thereafter, the computing unit 24 can compare the actual volume and the measured volume, such that in case the difference between the actual volume and the measured volume exceeds a threshold difference value, the computing unit 24 will determine that the first height h1 and the second radius r2 are abnormal values, and then the computing unit 24 transmits information to the control unit 5 or the test apparatus 10, so as to make the titration module 1 or the test apparatus 10 stop operation. In one embodiment, the threshold difference value is set to be ±15%, namely in case the actual volume is less or greater than the measured volume for 15%, the computing unit 24 will determine that the first height h1 and the second radius r2 are abnormal values, though not so limited. Still, in another embodiment, the threshold difference value is set to be ±10%, though not so limited.

In an embodiment, the measured volume can be defined as:

$$v = \frac{\pi h1}{6}(3r2^2 + h1^2);$$ (Formula 3)

wherein v is defined as the measured volume, and π is defined as the ratio of the circumference of a circle to its diameter Still further, in an embodiment, the computing device 24 relates to a computer program product or a firmware, and can be stored in a non-transitory computer-readable medium, which can be run by a processor or the control unit 5 in the titration module 1; or alternatively, which can be installed in an electronic device outside of the titration module 1 (for instance an external computer), though not so limited.

According to the present invention, as shown in FIG. 1 and FIG. 2, the carrier unit 4 is connected with the at least one titration unit 30 and the contact angle measurement module 22, and comprises driving devices 41, 42, 43 for performing multi-axial motions, so as to move selectively the at least one titration unit 30 and the contact angle measurement module 22, and to adjust the titration positions. In other words, the carrier unit 4 can move the at least one titration unit 30 to a place above the movable carrier 12 (see FIG. 1) so as to align the at least one titration unit 30 with the device under test 17. The control unit 5 is electrically connected with the carrier unit 4 so as to control the driving devices 41, 42, 43. Since the structure and the operational manner of the carrier unit 4 and of the control unit 5 are not significant to the present invention, no further detailed description therefor is necessary.

Further, in an embodiment, when the globule 31 falls on the device under test 17, the carrier unit 4 moves, respectively, the height measurement laser module 221 and the camera module 222 to a place above the globule 31 (the sequence of movement is not specifically limited), such that the height measurement laser module 221 can measure the first height h1 from above the globule 31, and that the camera module 222 measure the first radius r1 from above the globule 31. In an embodiment, the so-called "above" can be defined as "right above" of the globule 31; or on the other hand, the so-called "above" can be defined as a range 45 degrees clockwise or counterclockwise from the axis of the globule 31 center extending and perpendicular to the contact surface 171, though not so limited.

Still further, in an embodiment, both the height measurement laser module 221 and the camera module 222 are arranged above the movable carrier 12 near the at least one titration unit 30, without the necessity of arranging beside the prober 11. As such, the titration module 1 can be integrated with the existing probe card device.

As those skilled in the art may know that the titration module 1 can comprise more other components. However, since these components are not significant to the present invention, and since they are well known to those skilled in the art, no further detailed descriptions thereto are necessary.

According to the present invention, a method for measuring titration contact angles involves the process of operation for the contact angle measurement module 22 and for the computing unit 24, where the method is performed by the titration module 1. Now references are made to FIG. 1 to FIG. 4, wherein FIG. 4 is a flowchart illustrating a method for measuring titration contact angles according to an embodiment of the present invention.

Figure 4:
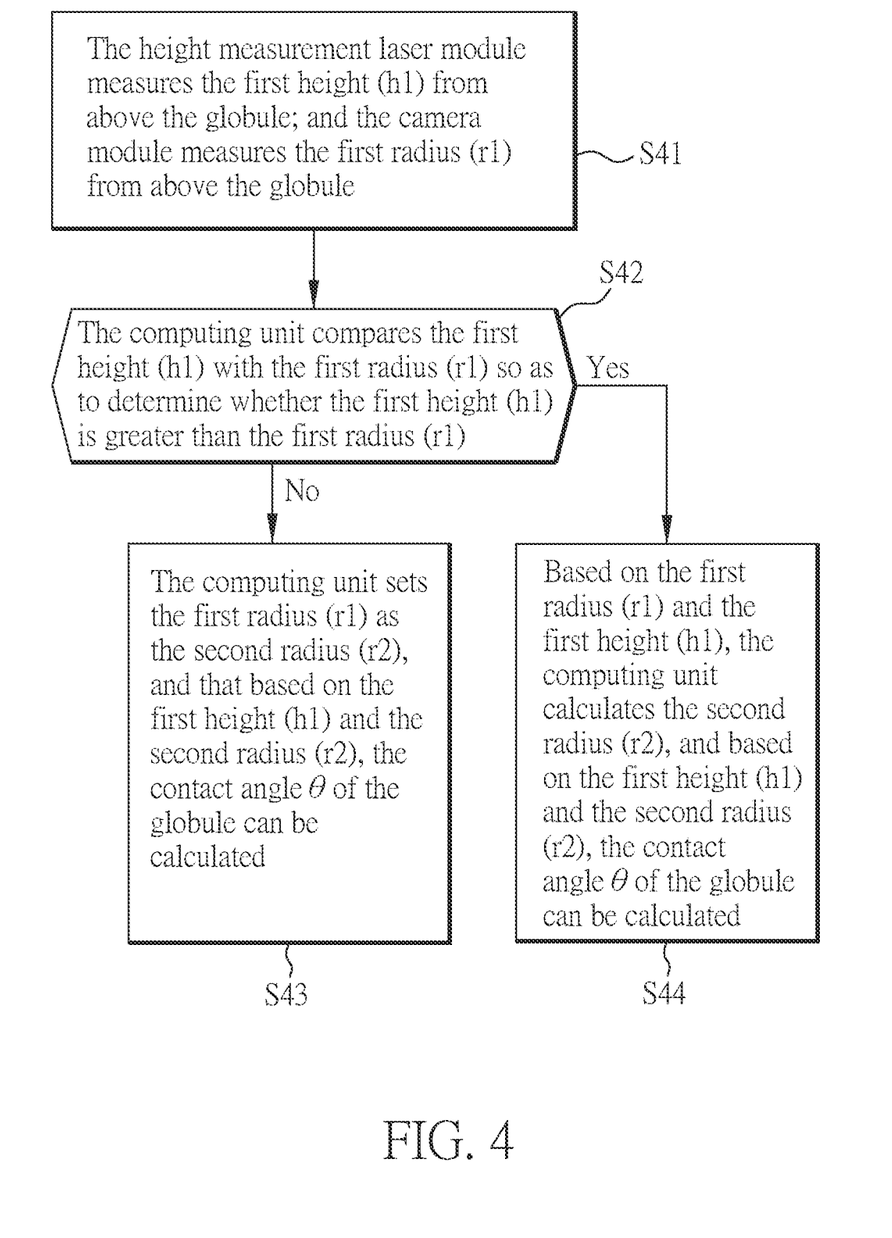
FIG. 4 is a flowchart illustrating a method for measuring titration contact angles according to an embodiment of the present invention.

As shown in FIG. 4, step S41 is performed first, namely, the height measurement laser module 221 measures the first height h1 of the globule 31 from above the globule 31; and the camera module 222 measures the first radius r1 of the globule 31 from above the globule 31. Thereafter, step S42 is performed, namely, the computing unit 24 compares the first height h1 with the first radius r1 so as to determine whether the first height h1 is greater than the first radius r1. In case the first height h1 is not greater than the first radius r1 (that is to say, the first height h1 is smaller than or equal to the first radius r1), then step S43 is performed, the computing unit 24 sets the first radius r1 as the second radius r2, and that calculates the contact angle θ of the globule 31 (Formula 2) according to the first height h1 and the second radius r2. However, in case the first height h1 is greater than the first radius r1, then step S44 is performed, such that the computing unit 24 calculates the second radius r2 according to the first height h1 and the first radius r1 (Formula 1), and calculates the contact angle θ of the globule 31 according to the first height h1 and the second radius r2 (Formula 2). As such, the method for measuring titration contact angles, according to the present invention, is completed, and that the contact angle θ of the globule 31 formed on the device under test 17 can be obtained.

Further, in applying the method for measuring titration contact angles to measure a wafer, there will be several embodiments available in accordance with the situations of measurement. First, the situation of measurement for a single wafer is described, together with references made to FIG. 1 to FIG. 5(B), wherein FIG. 5(A) is a schematic diagram illustrating the measurement for a wafer according to a first embodiment of the present invention; and FIG. 5(B) is a flowchart illustrating the wafer measurement according to the first embodiment of the present invention; and wherein FIG. 5(A) illustrates a top view of the wafer (for instance, viewed in a direction opposed to Z direction).

Figure 5A:
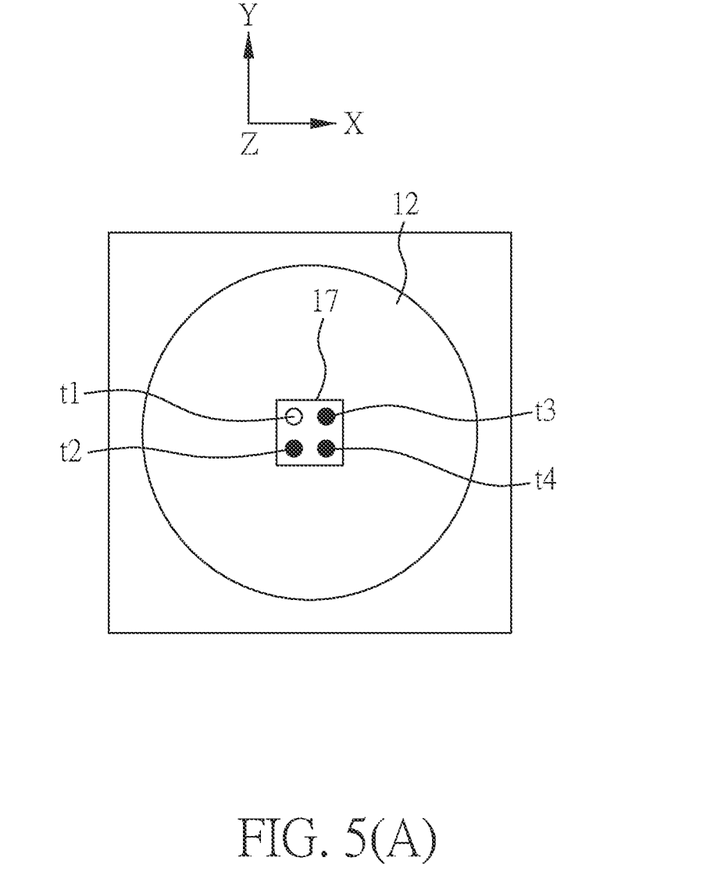
FIG. 5(A) is a schematic diagram illustrating the measurement for a wafer according to a first embodiment of the present invention.

As shown in FIG. 5(A), the device under test 17 relates to a wafer having a single chip, wherein the chip comprises a plurality of measuring points, and for convenience, explanation is given with four measuring points t1 to t4 as an example.

In an embodiment, the information about positions of the measuring points t1 to t4 are preset in probing configuration files (for instance, a first probing configuration file, file1 to a fourth probing configuration file file4). The control unit 5 can read the probing configuration files, file1 to file4, and control the carrier unit 4, so as to move the titration module 1 to where above the measuring points t1 to t4, though not so limited.

Figure 5B:
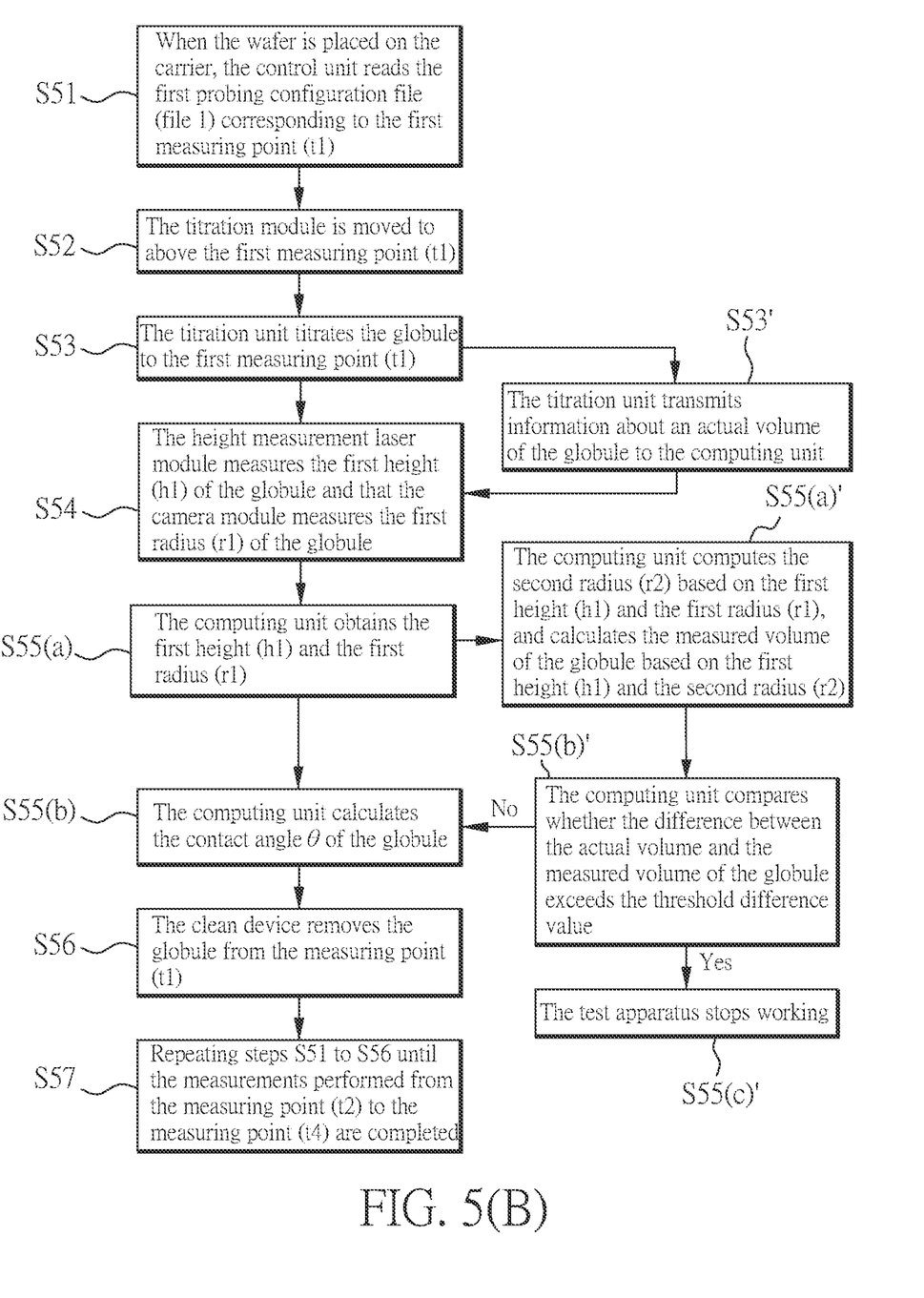
FIG. 5(B) is a flowchart illustrating the wafer measurement according to the first embodiment of the present invention.

As shown in FIG. 5(B), first, step S51 is performed, namely, when the wafer (the device under test 17) is placed on a carrier, the control unit 5 reads the first probing configuration file file1 corresponding to the measuring point t1. Thereafter, step S52 is performed, namely, the titration module 1 is moved to above the measuring point t1 (i.e. a first test position). Then step S53 is performed, namely, the at least one titration unit 30 titrates a globule 31 to the measuring point t1. Thereafter, step S54 is performed, namely, the height measurement laser module 221 measures the first height h1 of the globule 31 and that the camera module 222 measures the first radius r1 of the globule 31. Then step S55 (*a*) is performed, namely, the computing unit 24 obtains the first height h1 and the first radius r1. And then step S55 (*b*) is performed, namely, the computing unit 24 calculates the contact angle θ of the globule 31. Thereafter, step S56 is performed, namely, the clean device 19 removes the globule 31 from the measuring point t1. Then step S57 is performed, repeating steps S51 to S56 until the measurements performed from the measuring point t2 (ie. a second test position) to the measuring point t4 (i.e. a fourth test position) are completed. As such, a method for measuring titration contact angles applying to the wafer measurement process according to the first embodiment of the present invention can be accomplished.

Further, in an embodiment, after step S53 has been performed (i.e. the at least one titration unit 30 has titrated the globule 31 on the measuring point t1), a step S53' can be performed, namely, the at least one titration unit 30 transmits information about an actual volume of the globule 31 to the computing unit 24. After step S55(*a*) has been performed (the computing unit 24 acquires the first height h1 and the first radius r1), step S55(*a*)' can be then be performed, where the computing unit 24 calculates the second radius r2 according to the first height h1 and the first radius r1, and calculates the measured volume of the globule 31 according to the first height h1 and the second radius r2, for instance as calculated in accordance with Formula 3. Thereafter, step S55(*b*)' is performed, namely, the computing unit 24 compares whether the difference between the actual volume and the measured volume of the globule 31 exceeds the threshold difference value (for instance the difference exceeds ±15%). In case the difference between the actual volume and the measured volume of the globule 31 exceeds the threshold difference value, step 55(*c*)' is performed, and that the titration module 1 or the test apparatus 10 stops working. However, if the difference between the actual volume and the measured volume of the globule 31 does not exceed the threshold difference value (comprising if the difference is within ±15% or if the difference is exactly +15% or −15%), step 55(*c*)', then the titration module 1 or the test apparatus 10 continues to work, for instance, performing step S55(*b*), though not so limited. As such, the measurement data being used for the computing unit 24 can assure accuracy.

It should be noted that so long as feasibility of implementation exists, the aforementioned steps can be modified or changed.

Figure 6A:
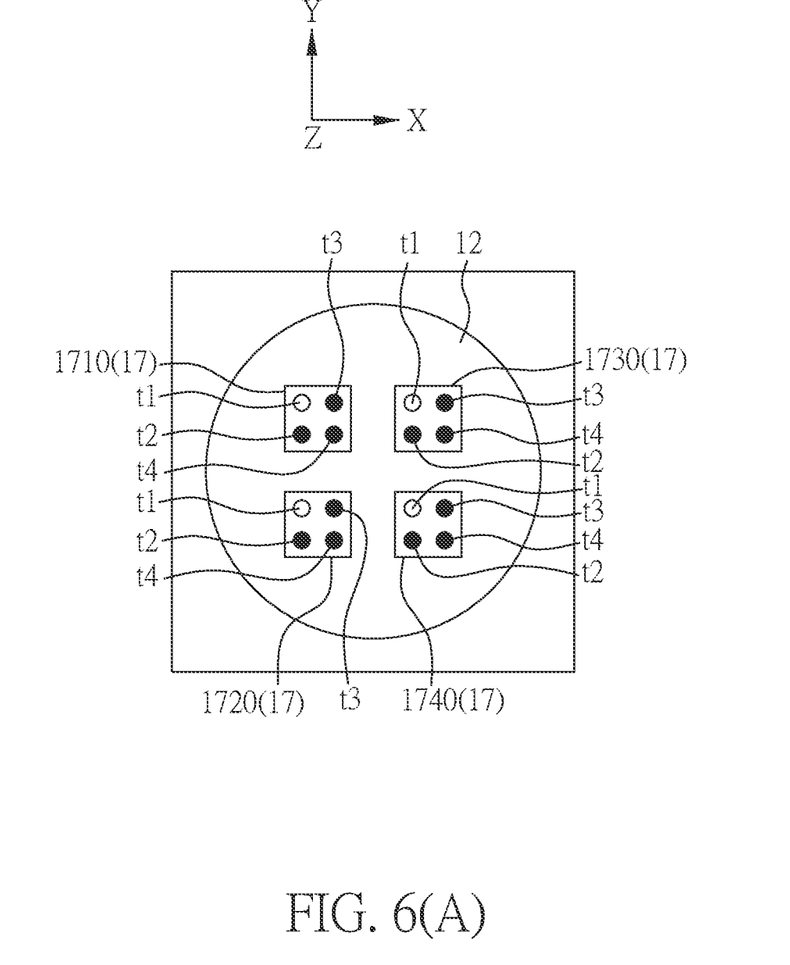
FIG. 6(A) is a schematic diagram illustrating the measurement for a wafer according to a second embodiment of the present invention.
Figure 6B:
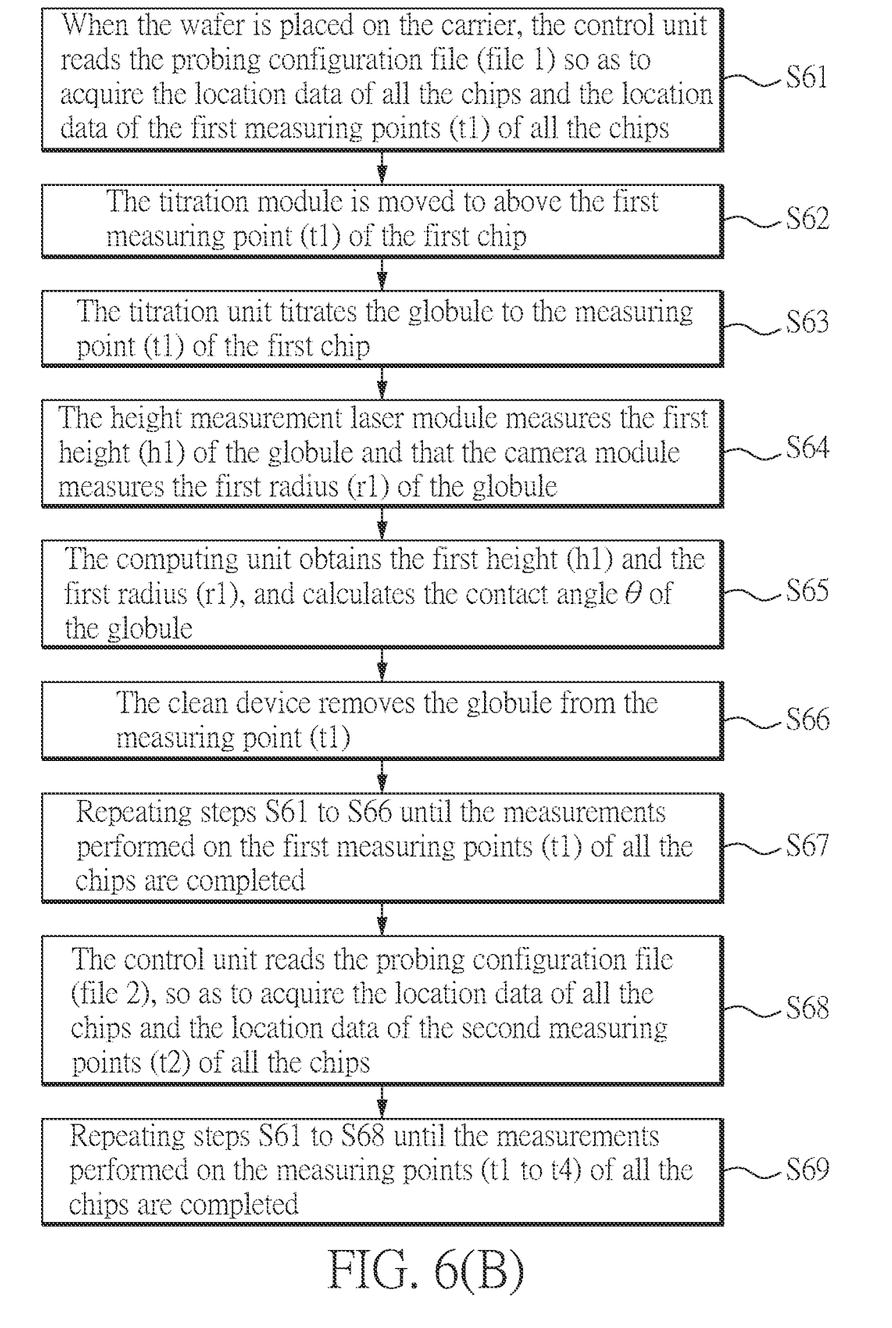
FIG. 6(B) is a flowchart illustrating the wafer measurement according to the second embodiment of the present invention.

Still further, in applying the method for measuring titration contact angles to measure a wafer, a second embodiment therefor is described as follows with references to FIG. 1 to FIG. 6(B), wherein FIG. 6(A) is a schematic diagram illustrating the measurement for a wafer according to the second embodiment of the present invention, and FIG. 6(B) is a flowchart illustrating the wafer measurement according to the second embodiment of the present invention. In the second embodiment, the measurement for a wafer having a plurality of chips is described.

As shown in FIG. 6(A), exemplification is given for the measurement of a wafer having four chips 1710-1740, wherein each of the four chips 1710-1740 has four measuring points t1 to t4. In an embodiment, the location information of the chips 1710-1740 and the measuring points t1 to t4 are preset in the probing configuration files file1 to file4. The control unit 5 can read the probing configuration files file1 to file4, and control the carrier unit 4, so as to move the titration module 1 to where above the measuring points t1 to t4 of the target chips 1710-1740. In an embodiment, the process of measurement is set as when all the measuring points t1 of the chips 1710-1740 of the wafer (i.e. the first test positions) have completed measurement, all the measuring points t2 (i.e. the second test positions) can then be proceeded with measurement, though not so limited.

Further, as shown in 6(B), first, step S61 is performed, namely, when the chips are placed on the carrier, the control unit 5 reads the first probing configuration file file1, so as to acquire the location data of all chips 1710-1740 on the wafer and the location data of the measuring points t1 of all the chips 1710-1740. Thereafter, step S62 is performed, namely, the titration module 1 is moved to above the measuring point t1 of the chip 1710. Then step S63 is performed, namely, the at least one titration unit 30 titrates a globule 31 to the measuring point t1 of the chip 1710. Thereafter, step S64 is performed, namely, the height measurement laser module 221 measures the first height h1 of the globule 31 and that the camera module 222 measures the first radius r1 of the globule 31. Then step S65 is performed, namely, the computing unit 24 obtains the first height h1 and the first radius r1, and calculates the contact angle θ of the globule 31. Thereafter, step S66 is performed, namely, the clean device 19 removes the globule 31 from the measuring point t1. Then step S67 is performed, repeating steps S61 to S66 until the measurements performed on the measuring points t1 of all the chips 1710-1740 are completed. Thereafter, step S68 is performed, namely, the control unit 5 reads the second probing configuration file, file 2, so as to acquire the location data of all the chips 1710-1740 and the location data of the measuring points t2 of all the chips 1710-1740. Then step S69 is performed, repeating steps S61 to S68 until the measurements performed on the measuring points t1 to t4 of all the chips 1710-1740 are completed.

Figure 7A:
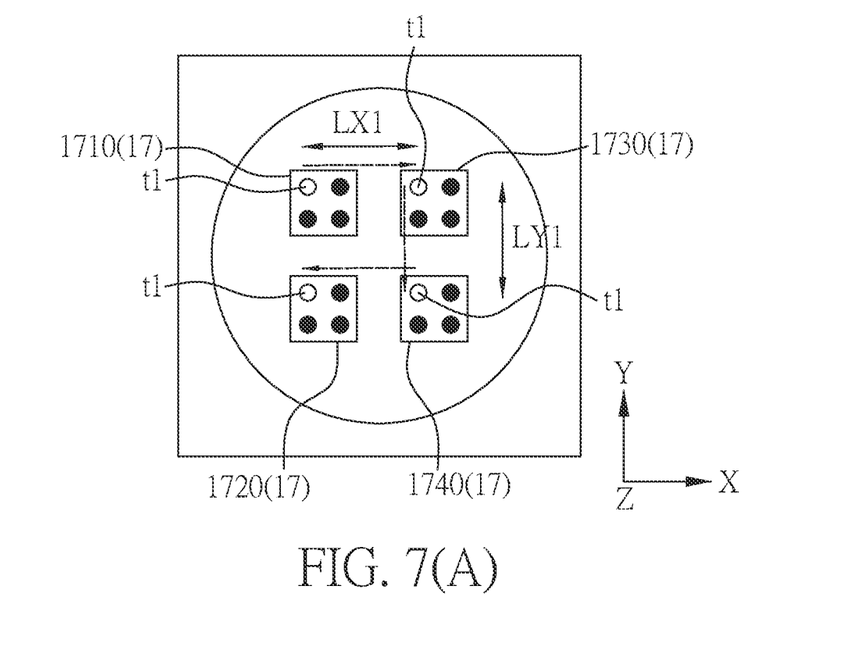
FIG. 7(A) is a schematic diagram illustrating a process of the wafer measurement at a first measuring point according to the second embodiment of the present invention.
Figure 7B:
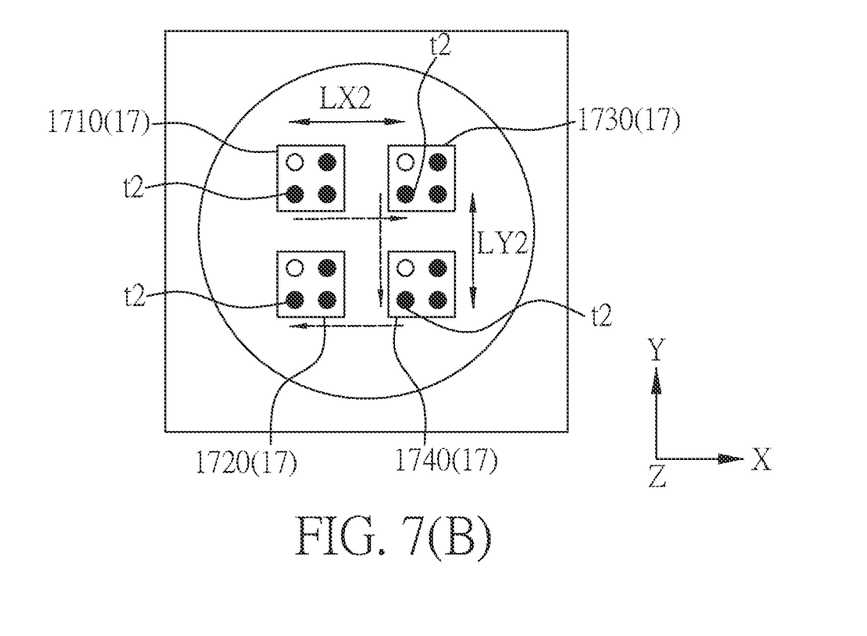
FIG. 7(B) is a schematic diagram illustrating a process of the wafer measurement at a second measuring point according to the second embodiment of the present invention.

Still further, references are made to FIG. 7(A), a schematic diagram illustrating a process of the wafer measurement (applying the method for measuring titration contact angles to measure a wafer having multiple chips) at the first measuring point t1 according to the second embodiment of the present invention; and FIG. 7(B), a schematic diagram illustrating a process of the wafer measurement (applying the method for measuring titration contact angles to measure a wafer having multiple chips) at the second measuring point t2 according to the second embodiment of the present invention. In the second embodiment, when the method for measuring titration contact angles is applied in the measurement process of wafers with multiple chips, the probing configuration files file1 to file4, are each able to record specific measuring positions of the chips 1710-1740, so as to drive and control the titration module 1, and to complete, in sequence, the work of measurement at the specific measuring points t1-t4 of each chip 1710-1740. In other words, the control unit 5 sets the data of specific coordinates of the measuring points t1 to t4 for each of the chips 1710-1740 by way of the probing configuration files file1 to file4. As such, the titration module 1 can move, respectively, to the same measuring points of the chips 1710-1740, so as to complete, in sequence, the work of measurement. As shown in FIG. 7(A), by way of the first probing configuration file file1, the measuring points t1 in the chips 1710-1740 for the titration module 1 can be controlled in sequence, namely, the titration module 1 can move with spacing LX1 and spacing LY1 on the X axis and the Y axis, respectively, so as to perform the work of titration at positions of the measuring points t1 for the chips 1710-1740. Further, as shown in FIG. 7(B), by way of the second probing configuration file file2, the measuring points t2 in the chips 1710-1740 for the titration module 1 can be controlled in sequence, namely, the titration module 1 can move with spacing LX2 and spacing LY2 on the X axis and the Y axis, respectively, so as to perform the work of titration at positions of the measuring points t2 for the chips 1710-1740. Similarly, for the work of titration at positions of the measuring points t3, t4 of the other chips 1710-1740, descriptions for the measurement given to the measuring points t1 and t2 also apply to those for the measuring points t3 and t4, and thus no repetition of description is necessary.

According to the present invention, upon performing an electric test, given that a probe card device (for instance but not limited to the prober 11 having a probe card 21 as shown in FIG. 1) is provided with multiple probes, the probe card device can through the probing configuration files, allow multiple probes to touch multiple pads on a single chip for performing the electric test, namely, the multiple probes need only to stay once on each individual chip. However, upon performing the titration test, the titration module 1 may be only arranged with one single titration unit 30. In view of the fact that the titration unit 30 may only titrate one test fluid on a specific measuring point (for instance t1), rather than being able to titrate test fluids, in the meantime, on multiple measuring points (for instance t1 to t4) on the single chip. As such, when the titration module 1 employs a single probing configuration file (for instance file1) of the probe card device, the titration module 1 can only move, in sequence, equidistantly to the same measuring point (for instance t1) of each chip (for instance 1710-1740), rather than make the titration module 1 titrate in the meantime completely for the titration measuring points (for instance t1 to t4). Therefore, by way of the method for measuring titration contact angles, according to the second embodiment, the titration module 1 employs multiple probing configuration files (for instance file1 to file4) for performing the titration work at the measuring points (for instance t1 to t4) for all the chips (for instance 1710-1740). This makes it possible that the titration module 1 can be integrated into the present probe card device.

Given the above, it is understood that the present invention provides a measuring device, a titration module, and a measuring method, having merits in the measurement of titration contact angles. Namely, not only the volume of the overall apparatus can be reduced, but also the purpose of accurate measurement can be achieved.

Although the present invention has been explained in relation to its preferred embodiments, it is to be understood that many other possible modifications and variations can be made without departing from the scope of the invention as hereinafter claimed.

What is claimed is:

1. A titration module, comprising:
a base;
at least one titration unit, disposed above the base for titrating a globule onto a device under test;
a contact angle measurement module, disposed above the base for measuring a first height and a first radius of the globule, wherein the first height relates to the maximum height of the globule in a longitudinal direction, and the first radius relates to the radius of the maximum projected area of the globule in the longitudinal direction, and the longitudinal direction is orthogonal to a contact surface between the globule and the device under test; and
a computing unit, for calculating a second radius according to the first height and the first radius, and calculating a contact angle of the globule according to the first height and the second radius;
wherein the contact angle measurement module comprises a height measurement laser module and a camera module, and wherein the height measurement laser module is for measuring the first height from above the globule, and the camera module is for measuring the first radius from above the globule;
wherein the computing unit compares the first height and the first radius, and wherein in response to determining that the first height is greater than the first radius, the computing unit calculates the second radius and the contact angle of the globule through the following formula:

$$r2 = \sqrt{2r1h1 - h1^2}\text{; and}$$

$$\theta = 2\tan^{-1}\left(\frac{h1}{r2}\right);$$

wherein r1 is defined as the first radius, θ is defined as the contact angle, h1 defined as the first height, and r2 defined as the second radius.

2. The titration module as claimed in claim 1, wherein in response to determining that the first height is smaller than or equal to the first radius, the computing unit sets the first radius as the second radius, and calculates the contact angle of the globule through the following formula:

$$\theta = 2\tan^{-1}\left(\frac{h1}{r2}\right);$$

and wherein θ is defined as the contact angle, h1 defined as the first height, and r2 defined as the second radius.

3. The titration module as claimed in claim 1, wherein the computing unit compares an actual volume of the globule with a measured volume which is calculated through the first height and the second radius, and in response to determining that the difference between the actual volume and the measured volume exceeds a threshold difference value, the computing unit determines that the first height and the second radius are abnormal values.

4. The titration module as claimed in claim 3, wherein the measured volume is defined as the following:

$$v = \frac{\pi h1}{6}(3r2^2 + h1^2);$$

and wherein v is defined as the measured volume, π defined as the ratio of the circumference of a circle to its diameter, h1 defined as the first height, and r2 defined as the second radius.

5. The titration module as claimed in claim 1, further comprising a carrier unit and a control unit, wherein the carrier unit is connected with the at least one titration unit and the contact angle measurement module, and comprises at least one driving device so as to move selectively the at least one titration unit and the contact angle measurement module; and wherein the control unit is electrically connected with the carrier unit so as to control the at least one driving device, and in case the devices under test has multiple test positions, the carrier unit moves the at least one titration unit and the contact angle measurement module to a first test position; and in response to determining that the contact angle of the globule is measured, the carrier unit moves the at least one titration unit and the contact angle measurement module to a second test position.

6. The titration module as claimed in claim 1, further comprising a carrier unit and a control unit, wherein the carrier unit is connected with the at least one titration unit and the contact angle measurement module, and comprises at least one driving device so as to move selectively the at least one titration unit and the contact angle measurement module; and wherein the control unit is electrically connected with the carrier unit so as to control the at least one driving device, and in case there are multiple devices under test, and each device under test has multiple test positions, the carrier unit moves, in sequence, the at least one titration unit and the contact angle measurement module to a first test position of each device under test; and in response to determining that the contact angle of the globule at the first test position of each device under test is measured, the carrier unit moves, in sequence, the at least one titration unit and the contact angle measurement module to a second test position of each device under test.

7. The titration module as claimed in claim 5, wherein the control unit comprises a first probing configuration file having a test-position parameter of the first test position and a second probing configuration file having a test-position parameter of the second test position.

8. The titration module as claimed in claim 6, wherein the control unit comprises a first probing configuration file having a test-position parameter of the first test position and a second probing configuration file having a test-position parameter of the second test position.

9. A test apparatus, comprising:
a prober, comprising a movable carrier and a probe card, wherein the movable carrier is for carrying a device under test, and the probe card is located above the device under test;
a titration module, comprising a base, at least one titration unit, a contact angle measurement module, and a computing unit, wherein the at least one titration unit is disposed above the base for titrating a globule onto the device under test, the contact angle measurement module is disposed above the base, and is provided for measuring a first height and a first radius of the globule, and wherein the first height relates to the maximum height of the globule in a longitudinal direction, the first radius relates to the radius of the maximum projected area of the globule in a longitudinal direction, and the longitudinal direction is orthogonal to a contact surface between the globule and the device under test; and wherein the computing unit calculates a second radius according to the first height and the first radius, and the computing unit calculates a contact angle of the globule according to the first height and the second radius; and a test head, comprising a test circuit board electrically connected with the probe card;

wherein the contact angle measurement module comprises a height measurement laser module and a camera module, and wherein the height measurement laser module is for measuring the first height from above the globule; and the camera module is for measuring the first radius from above the globule;

wherein the computing unit compares the first height and the first radius, and wherein in response to determining that the first height is greater than the first radius, the computing unit calculates the second radius and the contact angle of the globule through the following formula:

$$r2 = \sqrt{2r1h1 - h1^2}\text{; and}$$

$$\theta = 2\tan^{-1}\left(\frac{h1}{r2}\right);$$

wherein r1 is defined as the first radius, θ is defined as the contact angle, h1 defined as the first height, and r2 defined as the second radius.

10. The test apparatus as claimed in claim 9, wherein in response to determining that the first height is smaller than or equal to the first radius, the computing unit sets the first radius as the second radius, and calculates the contact angle of the globule through the following formula:

$$\theta = 2\tan^{-1}\left(\frac{h1}{r2}\right);$$

and wherein θ is defined as the contact angle, h1 defined as the first height, and r2 defined as the second radius.

11. The test apparatus as claimed in claim 9, wherein the computing unit compares an actual volume of the globule with a measured volume which is calculated through the first height and the second radius, and wherein in response to determining that the difference between the actual volume and the measured volume exceeds a threshold difference value, the computing unit determines that the first height and the second radius are abnormal values.

12. The test apparatus as claimed in claim 11, wherein the measured volume is defined as the following:

$$v = \frac{\pi h1}{6}(3r2^2 + h1^2);$$

and wherein v is defined as the measured volume, π defined as the ratio of the circumference of a circle to its diameter, h1 defined as the first height, and r2 defined as the second radius.

13. The test apparatus as claimed in claim 9, wherein the titration module further comprises a carrier unit and a control unit, and the carrier unit is connected with the at least one titration unit and the contact angle measurement module, and includes at least one driving device so as to move selectively the at least one titration unit and the contact angle measurement module; and wherein the control unit is electrically connected with the carrier unit so as to control the at least one driving device, and in case the device under test has multiple test positions, the carrier unit moves the at least one titration unit and the contact angle measurement module to a first test position; and in response to determining that the contact angle of the globule is measured, the carrier unit moves the at least one titration unit and the contact angle measurement module to a second test position.

14. The test apparatus as claimed in claim 9, wherein the titration module further comprises a carrier unit and a control unit, and the carrier unit is connected with the at least one titration unit and the contact angle measurement module, and includes at least one driving device so as to move selectively the at least one titration unit and the contact angle measurement module; and wherein the control unit is electrically connected with the carrier unit so as to control the at least one driving device, and in case there are multiple devices under test, and each device under test has multiple test positions, the carrier unit moves, in sequence, the at least one titration unit and the contact angle measurement module to a first test position of each device under test; and in response to determining that the contact angle of the globule at the first test position of each device under test is measured, the carrier unit moves, in sequence, the at least one titration unit and the contact angle measurement module to a second test position of each device under test.

15. The test apparatus as claimed in claim 13, wherein the control unit comprises a first probing configuration file having a test-position parameter of the first test position and a second probing configuration file having a test-position parameter of the second test position.

16. The test apparatus as claimed in claim 14, wherein the control unit comprises a first probing configuration file having a test-position parameter of the first test position and a second probing configuration file having a test-position parameter of the second test position.

17. A method for measuring titration contact angles, implemented with a titration module comprising a base, a titration unit disposed above the base for titrating a globule onto a device under test, a contact angle measurement module, disposed above the base, comprising a height measurement laser module and a camera module, and a computing unit, wherein the method comprises the following steps:

by the height measurement laser module, measuring the first height from above the globule, and by the camera module, measuring the first radius from above the globule, wherein the first height relates to the maximum height of the globule in a longitudinal direction, the first radius relates to the radius of the maximum projected area of the globule in a longitudinal direction, and the longitudinal direction is orthogonal to a contact surface between the globule and the device under test; and by the computing unit, calculating a second radius according to the first height and the first radius, and calculating a contact angle of the globule according to the first height and the second radius;

wherein the method further comprises the following steps:
by the computing unit, comparing the first height with the first radius; and
in response to determining that the first height is greater than the first radius, calculating the second radius and the contact angle of the globule through the following formula by the computing unit:

$$r2 = \sqrt{2r1h1 - h1^2} \text{; and}$$

$$\theta = 2\tan^{-1}\left(\frac{h1}{r2}\right);$$

wherein r1 is defined as the first radius, θ is defined as the contact angle, h1 defined as the first height, and r2 defined as the second radius.

18. The method for measuring titration contact angles as claimed in claim 17, further comprising the following steps:
in response to determining that the first height is smaller than or equal to the first radius, setting the first radius as the second radius, and calculating the contact angle of the globule through the following formula by the computing unit:

$$\theta = 2\tan^{-1}\left(\frac{h1}{r2}\right);$$

wherein θ is defined as the contact angle, h1 defined as the first height, and r2 defined as the second radius.

19. The method for measuring titration contact angles as claimed in claim 17, further comprising the following steps:
by the computing unit, comparing an actual volume of the globule with a measured volume which is calculated through the first height and the second radius; and
in response to determining that the difference between the actual volume and the measured volume exceeds a threshold difference value, the computing unit determines that the first height and the second radius are abnormal values.

20. The method for measuring titration contact angles as claimed in claim 19, wherein the measured volume is defined as the following:

$$v = \frac{\pi h1}{6}(3r2^2 + h1^2);$$

and wherein v is defined as the measured volume, π defined as the ratio of the circumference of a circle to its diameter, h1 defined as the first height, and r2 defined as the second radius.

21. The method for measuring titration contact angles as claimed in claim 17, wherein the titration module further comprises a carrier unit and a control unit, and the carrier unit is connected with the at least one titration unit and the contact angle measurement module, and includes at least one driving device so as to move selectively the at least one titration unit and the contact angle measurement module, and wherein the control unit is electrically connected with the carrier unit so as to control the at least one driving device, and further comprising the following steps:
in case the device under test includes multiple test positions, the carrier unit moves the at least one titration unit and the contact angle measurement module to a first test position; and
in response to determining that the first height and the first radius of the globule at the first test position are measured, the carrier unit moves the at least one titration unit and the contact angle measurement module to a second test position.

22. The method for measuring titration contact angles as claimed in claim 17, wherein the titration module further comprises a carrier unit and a control unit, and the carrier unit is connected with the at least one titration unit and the contact angle measurement module, and includes at least one driving device so as to move selectively the at least one titration unit and the contact angle measurement module, and wherein the control unit is electrically connected with the carrier unit so as to control the at least one driving device, and further comprising the following steps:
in case there are multiple devices under test, and each device under test has multiple test positions, the carrier unit moves, in sequence, the at least one titration unit and the contact angle measurement module to a first test position of each device under test; and
in response to determining that the first height and the first radius of the globule at the first test position of each device under test are measured, the carrier unit moves, in sequence, the at least one titration unit and the contact angle measurement module to a second test position of each device under test.

23. The method for measuring titration contact angles as claimed in claim 21, wherein the control unit comprises a first probing configuration file having a test-position parameter of the first test position and a second probing configuration file having a test-position parameter of the second test position.

24. The method for measuring titration contact angles as claimed in claim 22, wherein the control unit comprises a first probing configuration file having a test-position parameter of the first test position and a second probing configuration file having a test-position parameter of the second test position.

* * * * *